United States Patent [19]

Hege

[11] 3,948,492
[45] Apr. 6, 1976

[54] CENTRIFUGAL MIXING APPARATUS AND METHOD

[75] Inventor: Douglas W. Hege, Huntington Beach, Calif.

[73] Assignee: Hege Advanced Systems Corporation, Huntington Beach, Calif.

[22] Filed: May 1, 1974

[21] Appl. No.: 466,023

Related U.S. Application Data

[62] Division of Ser. No. 259,678, June 5, 1972, Pat. No. 3,820,759.

[52] U.S. Cl. .......................... 259/24; 259/8; 261/87
[51] Int. Cl.² .... B01F 5/16; B01F 7/20; B01F 15/02
[58] Field of Search .............. 259/8, 23, 24, 43, 44, 259/66, 67, 96, 107, 108; 261/84, 87

[56] References Cited
UNITED STATES PATENTS

| | | | |
|---|---|---|---|
| 3,233,876 | 2/1966 | Faure | 259/8 X |
| 3,393,802 | 7/1968 | Logue | 261/84 X |
| 3,820,759 | 6/1964 | Hege | 259/24 |

Primary Examiner—Stanley N. Gilreath
Assistant Examiner—Alan Cantor
Attorney, Agent, or Firm—Kenyon & Kenyon Reilly Carr & Chapin

[57] ABSTRACT

An improved apparatus and method for mixing a second material into a first fluid material includes a container for the first fluid material, a motor driven centrifugal impeller, and a conduit having an outlet coaxial with and adjacent to the centrifugal impeller for feeding the second material into the center of the impeller. The impeller is located in the container of fluid material, and the improved apparatus includes means for directing a portion of the fluid from the container inward for mixing with the second material as it enters the center of the impeller and means for directing at least a portion of the mixture flowing from the impeller outward for dispersion in the fluid in the container. The apparatus preferably also includes means for recirculating a portion of the mixture from the impeller directly back for mixing with and imparting momentum to the first and second materials as they enter into the center of the impeller. An alternate embodiment of the apparatus includes a venturi section coaxially surrounding the conduit for feeding the second material into the center of the impeller and means for recirculating at least a portion of the mixture flowing from the impeller back to the inlet of the venturi section to augment the pressure at the impeller inlet.

4 Claims, 11 Drawing Figures

CENTRIFUGAL MIXING APPARATUS AND METHOD

This is a division of application Ser. No. 259,678 filed June 5, 1972, now U.S. Pat. No. 3,820,759.

BACKGROUND OF THE INVENTION

This invention relates to a method and apparatus for mixing a second material into a first fluid material by use of a centrifugal impeller. The second material is usually a dry particulate material but can also be a liquid or a gas, and the first material is normally a liquid.

Centrifugal pump mixers or blenders are well known in which dry ingredients, liquids, or gases are blended into a liquid by feeding the ingredients through a conduit into the inlet of a centrifugal pump having an open-face impeller. The liquid is supplied under pressure tangentially into an annular passageway surrounding the conduit and then directed outward for flow through at least a portion of the impeller passageways before discharge from the pump casing. Some mixing of the liquid and the added ingredients occurs in the pump impeller, but such mixing is limited because the liquid does not flow inward to join with the added ingredient in the center of the impeller but instead is diverted by a flange at the end of the conduit to flow outward between the pump casing and the open-face centrifugal impeller. The pump casings in these prior art mixers are of conventional volute form and have a single outlet tangent to the outer circumference. In a typical process application, the liquid carrying the entrained added ingredients will be conducted through an external pipeline to a separate storage tank. Normally, more thorough mixing is required than results from a single pass through the mixing pump; so a line will be connected between the bottom of the storage tank and the inlet to the annular passageway for recirculating a portion of the mixture in the tank back through the mixing pump.

Except for mixtures of very low viscosity, such a system will require a second centrifugal pump in the recirculating supply line for mixtures of moderate viscosity (up to approximately 20% solids). For high viscosity mixtures, a third support or booster pump may be needed in the discharge line between the mixer and the storage tank and both the supply and the discharge recirculating booster pumps may have to be of positive displacement type for the thicker mixtures (40 – 60% solids). The recirculation support pumps, pipe and fittings required for operation of these prior art mixers not only add significantly to the cost of a complete mixing installation but also create a cleanout problem, particularly if recirculation is stopped and the mixture allowed to set up in the system.

SUMMARY OF THE INVENTION

The present invention provides an improved method and arrangement for using a centrifugal impeller to provide superior mixing of one material into another. An important feature is that the impeller is positioned inside a mixing container, and the method includes the steps of directing a portion of the material in the container inward for flow into the center of the impeller and directing at least a portion of the material flowing from the impeller outward at high velocity for dispersion into the material in the container.

The recirculating flow of material through the impeller and the secondary mixing that takes place in the container of the present apparatus substantially improve the rate and degree of mixing over that obtainable with a centrifugal impeller of the same characteristics when mounted in a conventional pump casing.

In a preferred embodiment of the apparatus of the invention a means for directing a portion of the material in the container inward for flow into the center of the impeller includes a first member preferably in the form of a circular plate, positioned on one side of the impeller and extending from an outer circumference at least as great as the outer circumference of the impeller to an inner opening coaxial with the axis of rotation of the impeller. The plate prevents the material in the container from entering the impeller except by flowing inward and through the inner opening to the center of the impeller.

For most applications of the invention, the material in the container will be a liquid. Additional material, usually in the form of dry ingredients, is added by feeding it through a conduit having an outlet coaxial with and adjacent to the pump inlet. Preferably, the conduit outlet terminates in a flange, spaced axially from the circular plate to form a second member that defines with the first member opposed surfaces for directing a portion of the first material from the container inward to mix with the added ingredients as they leave the conduit.

An important advantage of this arrangement is that the material from the container, as it flows into the central opening of the first member in response to the pumping action of the rotating impeller, creates a moving liquid funnel that draws the added ingredients into and through the impeller with minimum opportunity for caking and thus choking the impeller inlet.

For still greater mixing effectiveness, an alternate embodiment of the invention provides momentum augmentation by recirculating a portion of the mixture flowing from the impeller directly back for mixing with the material from the container and the added ingredients as they enter into the center of the impeller.

Still another embodiment, particularly suited for mixing gaseous material into a liquid, includes a venturi section coaxially surrounding the feed conduit to provide pressure augmentation at the impeller inlet, thus avoiding cavitation as a result of adding the gaseous material. This augmented pressure is obtained by directing a portion of the mixture flowing from the centrifugal impeller to the inlet of the venturi section. Material from the container also flows inward to mix with the recirculated mixture entering the venturi inlet and the material added through the conduit.

Accordingly, it is an object of the invention to provide method and apparatus for producing improved mixing action by means of a centrifugal impeller.

It is still another object of the invention to provide a method and apparatus for mixing dry material into a liquid which produces a uniform mixture in the shortest possible time.

Still another object of the invention is to provide a centrifugal impeller apparatus for mixing gases into liquid materials without producing cavitation at the impeller inlet.

Further objects and advantages of the present invention will become apparent from a consideration of the drawings in connection with the following description of the preferred embodiments.

DESCRIPTION OF THE PREFERRED EMBODIMENTS

Figure 1:
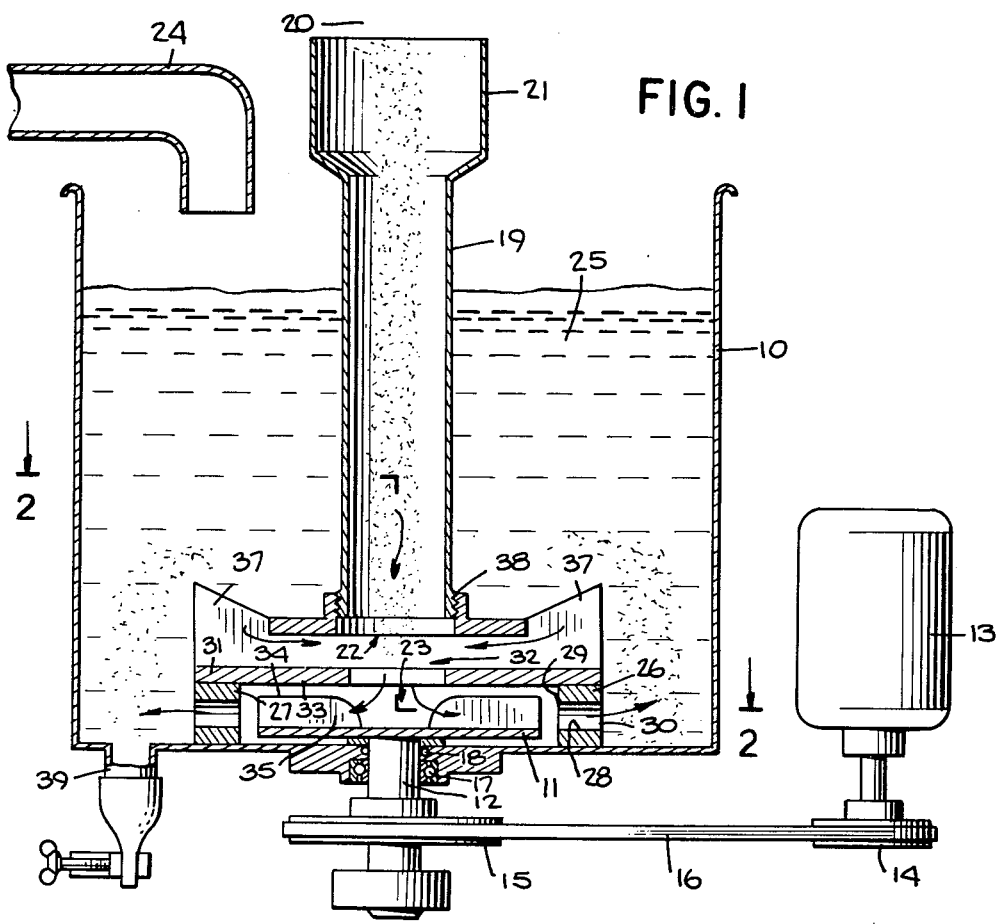
FIG. 1 is an elevation view of a preferred embodiment of the present invention.
Figure 2:
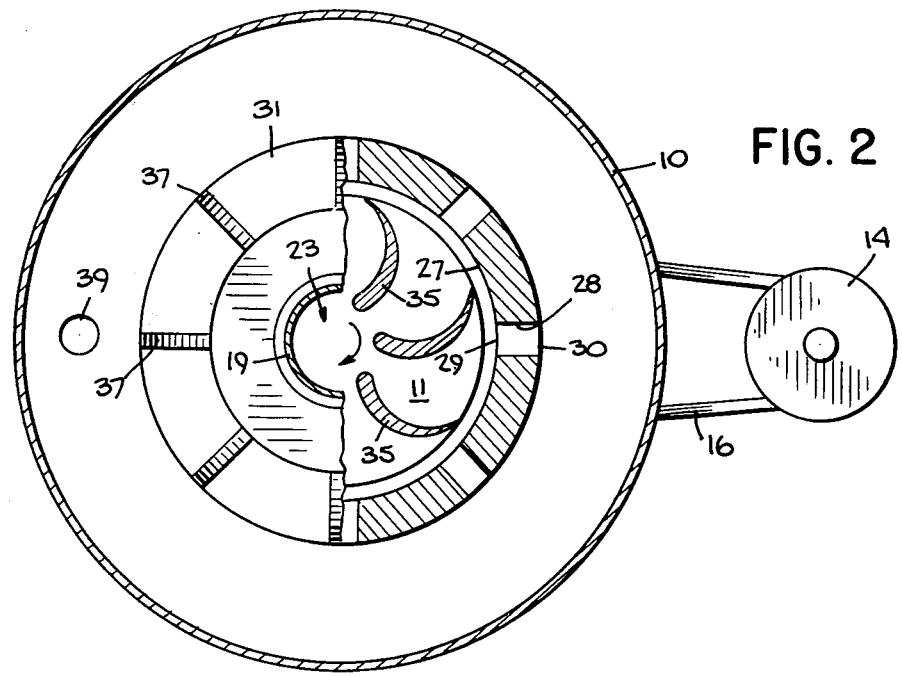
FIG. 2 is a plane view along section lines 2—2 of FIG. 1.

Referring to FIGS. 1 and 2, the present invention includes a container 10 having a centrifugal impeller 11 mounted for rotation on a shaft 12 extending through the bottom of the container and driven by an electrical motor 13 through pulleys 14 and 15 by V-belt 16. Shaft 12 is journaled for rotation in bearing 17 attached to the bottom of the container. A liquid seal 18 prevents leakage from the container between shaft 12 and bearing 17. A conduit 19 for feeding a second material 20 into the center of the impeller extends coaxially with the axis of impeller rotation. At the upper end of conduit 19 is a funnel-shaped inlet 21. Conduit 19 terminates at an outlet 22 adjacent to the inlet 23 of impeller 11.

A supply pipe 24 permits filling container 10 with a first fluid material 25 to a desired level prior to feeding the second material through conduit 19.

A structure such as circular wall 26 surrounds the circumference of centrifugal impeller 11, the inner surface 27 of wall 26 being radially spaced from the impeller to provide rotational clearance. Passageways 28 are circumferentially spaced around wall 26 with inlets 29 adjacent the impeller and oulets 30 opening into the container.

A first member, such as circular plate 31, is mounted on top of wall 26. The outer circumference of plate 31 is at least as great as the outer circumference of the impeller, and the plate has a central opening 32 coaxial with the impeller to provide an inlet to the center of the impeller. Inner surface 33 of plate 31 is axially spaced from faces 34 of impeller blades 35 to provide sufficient clearance for rotation of the impeller.

A second member such as flange 36 is connected in coaxially spaced relation to plate 31 by guide vanes 37 and, in turn, supports the outlet of conduit 19 by means of threaded coupling 38. Guide vanes 37 serve to properly direct the flow of material from the container into the impeller and also to prevent vortex circulation of the bulk of the material in the container that would otherwise reduce mixing effectiveness.

First member 31 and second member 36 define between them a passageway for directing fluid material in the chamber inwardly and downwardly through opening 32 into the center of impeller 11.

In operation, container 10 is first filled to a desired level with a fluid material from supply pipe 24, and the electric motor is started to cause circulation of the first fluid material inward between members 31 and 26, through opening 32 into the center of impeller 11, and then outward through impeller vanes 35 and passageways 28 back to mix with the material in the container. A second material 20, usually a dry powdered or granular material, is poured into funnel 21 and thence feeds through conduit 19 for mixture with inflowing material 25 at the outlet of the conduit. The two materials then flow together through opening 32, outward between impeller blades 35, and then out through passageways 28 into the container. After the desired amount of second material 20 has been added, the mixer can be run for as long as desired, and then the resulting mixture can be drained off through outlet 39.

Alternatively, the apparatus can be operated as a continuous rather than as a batch mixer by maintaining continual flow through supply pipe 24, conduit 19, and outlet 29 at rates depending upon the ratio of materials and degree of mixing desired for the finished product.

The advantages of the preferred embodiment in providing improved mixing by means of recirculation through the impeller and secondary mixing in the container are clearly apparent from FIGS. 1 and 2. First of all, the design of the present invention permits intimate mixing of the first and second materials before they enter the center of the impeller. As a consequence, both materials travel together through the impeller blades. The material flowing from the impeller is then directed in a plurality of high velocity streams through passageways 28 to mix intimately with and to set up secondary circulating currents in the remaining fluid in container 10.

As mentioned previously, an additional advantage accruing from the inward flow of material 25 through opening 32 is that the inflowing material 25 creates a moving liquid funnel that sucks material 20 into the impeller as it is added, without permitting it to cake or stick to inlet 32.

It should be noted that circular wall 26, in conjunction with passageways 28, insures that there will be less momentum loss of the mixture flowing from impeller 11 than occurs in the typical scroll-type pump casing having a tangential outlet; so that the mixture flows through passageways 28 with a relatively high velocity, and the outflowing jets disperse fully and completely in the surrounding fluid in the container.

Figure 2B:
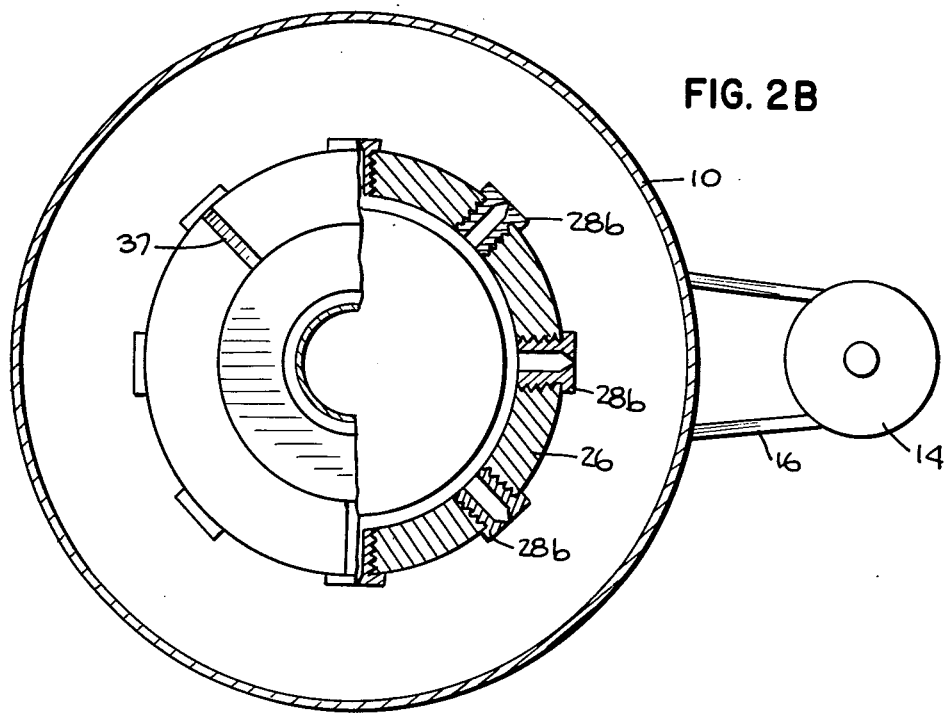
FIGS. 2A and 2B are alternate embodiments of FIG. 2.
Figure 2A:
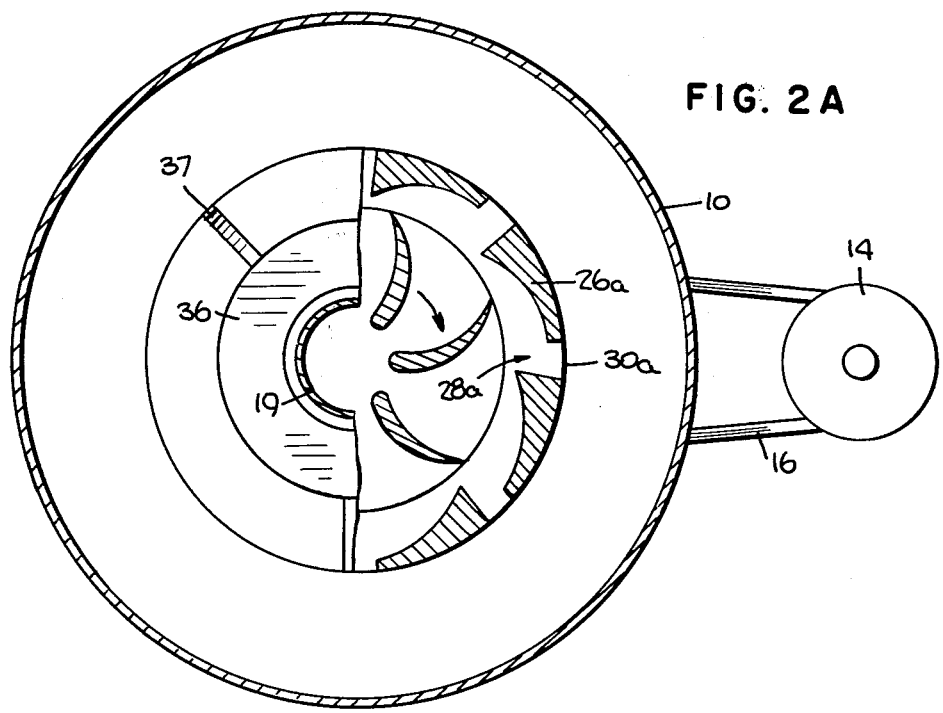

The passageways 28 have been depicted in FIG. 2 as being straight and radial, but alternatively they may be angled to impart a swirling, stirring motion to the fluid in the container. They may be angled all in the same direction or alternating in opposite directions, depending upon the type of secondary mixing action desired. Referring to FIGS. 2a and 2b, passageways 28 of FIG. 2 may be replaced by passageways 28a in FIG. 2a or nozzles 28b as in FIG. 2b. Passageways 28a in FIG. 2a are created by removal of the inner surface of wall 26a in the form of an increasing spiral leading to the inlet of each passageway, the diameter of the spiral increasing in the direction of impeller rotation. This arrangement permits a portion of the kinetic energy of the mixture flowing out from the impeller to be converted to pressure in the increasing spiral region and then to be reconverted to high velocity kinetic energy in passing through outlets 30a. The nozzles of FIG. 2, on the other hand, are useful in situations where it is desired to have very high velocity mixing jets directed into the material in container 10. This arrangement is particularly useful when mixtures are allowed to settle and then must be stirred up again.

Figure 3:
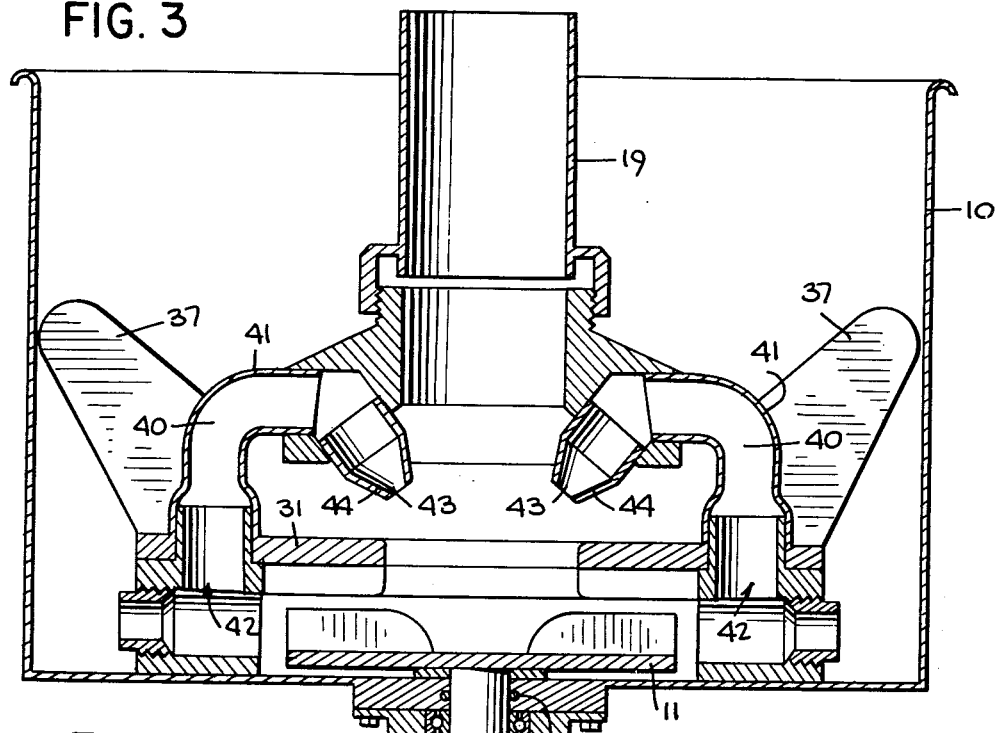
FIG. 3 is an elevation view of an alternate embodiment of the invention.

Referring to FIG. 3, an alternate embodiment of the apparatus of FIG. 1 provides momentum augmentation for improved mixing of thicker type slurries and the like. Similar components are designated by the same numbers as in the previous figures. The embodiment of FIG. 3 includes means such as passageways 40 for recirculating a portion of the mixture flowing from the impeller directly back for mixing with and imparting momentum to the first and second materials as they flow into the center of the impeller. Passageways 40 are formed by at least two conduit members 41 having circumferentially spaced inlets 42 adjacent the circumference of the impeller and circumferentially spaced outlets 43 adjacent outlet 22 of conduit 19 for feeding the first material into the center of the impeller. Outlets 43 are preferably in the form of converging nozzles 44 for producing higher velocity jets and, therefore, greater momentum augmentation. Inlets 42 and outlets 43 are preferably equally spaced about the impeller circumference and conduit outlet 22, respectively, to provide balanced flow. Outlets 43 may be directed either in radial planes to intersect the axis of rotation of impeller 11, or they may be angled tangentially to produce a swirling motion either in the same or opposite direction to the rotation of the impeller, as desired for optimum mixing of specific materials.

Figure 4:
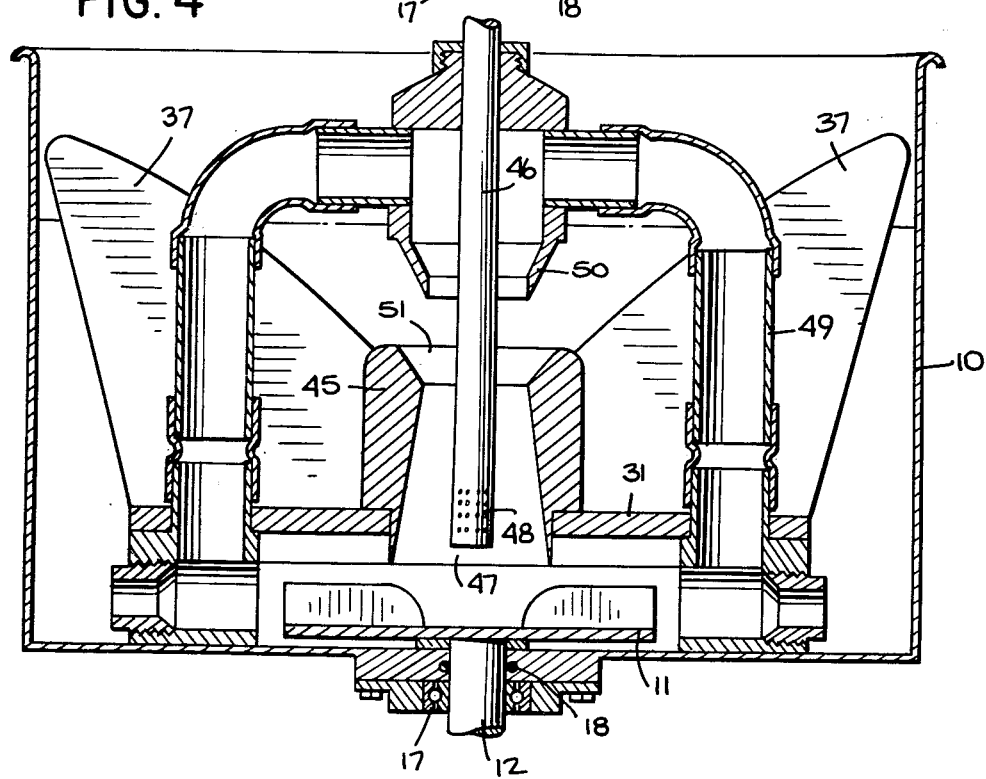
FIG. 4 is an elevation view in section of another alternate embodiment of the invention.

Referring next to FIG. 4, still another embodiment, particularly useful for mixing gases into liquids, combines a venturi type jet pump with the centrifugal impeller mixing apparatus of the previous embodiments. In FIG. 4, a venturi section 45 coaxially surrounds central conduit 46 adapted for supplying gas for mixing with a liquid material in container 10. The outlet 47 of venturi section 45 is located adjacent to the outlets 48 of conduit 46 and connects with the central opening in plate 31 leading to the center of impeller 11. Means such as tubes 49 direct at least a portion of the mixture flowing from the impeller through a converging nozzle 50 to enter inlet 51 of the venturi section as a high velocity stream. As this stream enters venturi 45, it draws a portion of the liquid in the container inward for mixing with a gas from the outlet of conduit 46 as the liquid enters the center of the impeller. The outlet of conduit 46 should be preferably far enough downstream in the diverging portion of the venturi so that the ambient pressure will tend to force the gas bubbles into solution.

The combination of a jet pump with the centrifugal impeller in the embodiment of FIG. 4 is particularly advantageous when mixing gases into a liquid because the added pressure provided by the jet pump at the inlet to the impeller tends to prevent cavitation, thus maintaining both pumping and mixing efficiency through the impeller.

Figure 5:
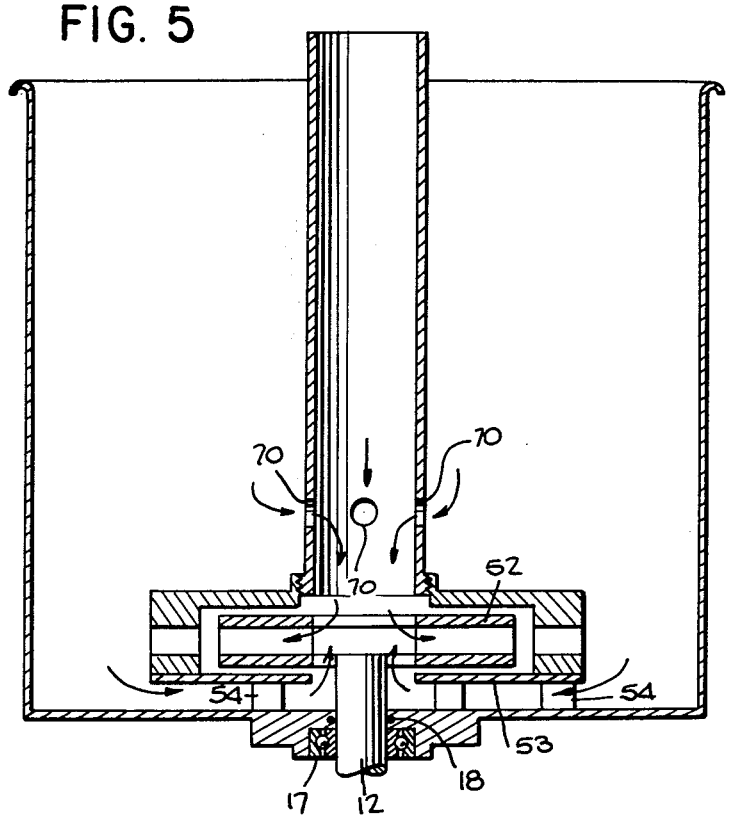
FIG. 5 is an elevation view in section of still another alternative embodiment of the invention.

In all the above embodiments, the second material fed through the central conduit and the portion of the first material directed inward for mixing with the second material as it enters the center of the impeller are supplied from the same side of the impeller. FIG. 5 illustrates another embodiment of the invention in which the second material is fed through conduit 19 into the top of impeller 52, and the first material from container 10 is directed inward between the bottom of container 10 and cover plate 53, spaced from the container bottom by support 54, for flow upward into the bottom of the impeller. Additional portions of the first material flow inward through holes 70 in conduit 19 in this embodiment, but these holes can be eliminated, if desired. As in the previous embodiments, the two materials mix as they enter the center of the impeller and flow outward together through the passageways defined by the impeller blades. Impeller 52 in FIG. 5 is shown with a closed face, but it can also be an open face type, which has the advantage of being easier to clean.

Figure 6:
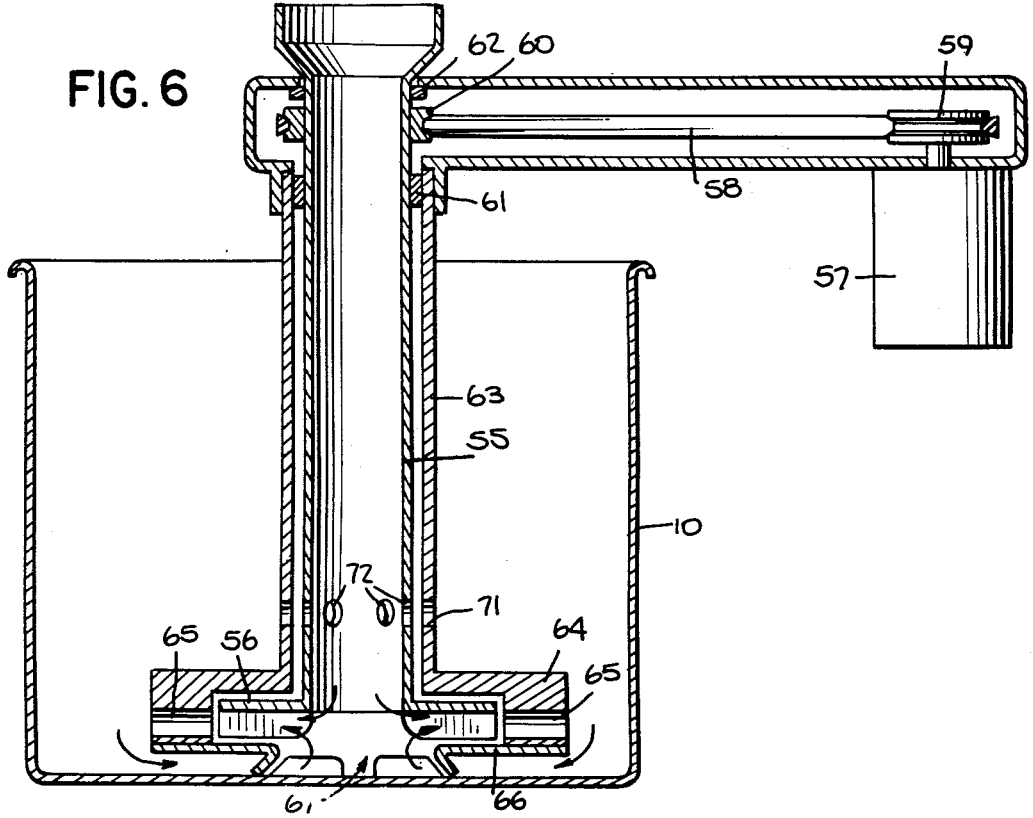
FIG. 6 is an elevation view in section of still another alternative embodiment of the invention.

Referring to FIG. 6, still another embodiment of the invention uses the counter flow principle of FIG. 5 in self-contained mixing apparatus that requires no connection to or rotary seals through container 10. For this reason, the apparatus of FIG. 6 is particularly adaptable to portable mixing applications such as hand-held domestic mixers or tank-mounted industrial mixers. In the embodiment of FIG. 6, conduit 55 is rigidly connected to impeller 56, and both are mounted for rotation by electrical motor 57 through V-belt 58 and pulleys 59 and 60. Conduit 55 is supported for rotation by bearings 61 and 62 in tubular support member 63. Support member 63 terminates at its lower end in housing 64 having passageways 65 leading from adjacent the circumference of impeller 56 to the material in the container. Bottom cover plate 66 having center opening 67 provides a safety cover to prevent injury by rotating impeller 56, and legs 68 permit circulation of fluid from container 10 into the center of impeller 56 for mixing with a second material added through conduit 55. As in the embodiment of FIG. 5, material from the tank may be supplied to the impeller optionally through holes 71 in tubular support member 63 and holes 72 through rotating feed conduit 55 in addition to the upward flow through opening 67.

Figure 7:
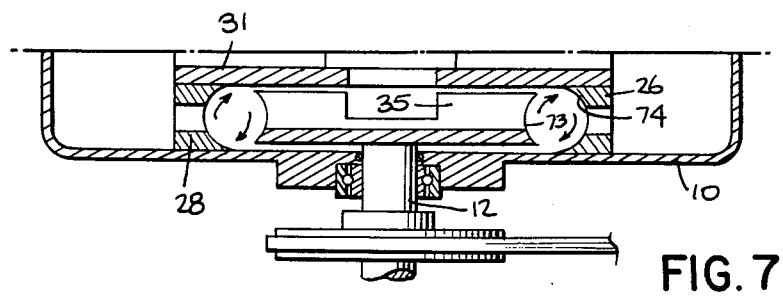
FIG. 7 is a section of an alternate blade tip impeller casing design for creating a toroidal vortex in the mixture leaving the impeller.

Turning next to FIG. 7, the outer ends 73 of impeller blades 35 and the inner surface 74 of circular wall 26 may optionally be curved rather than straight as is shown in the previous embodiments. Curved ends 73 and curved surface 74 combine to create a toroidal space of substantially circular cross section that encourages the formation of a toroidal vortex in the material leaving the impeller blades, as indicated by the arrows. The shearing forces set up in the mixture by this vortex improve the mixing effectiveness of the impeller for at least some materials.

Figure 8:
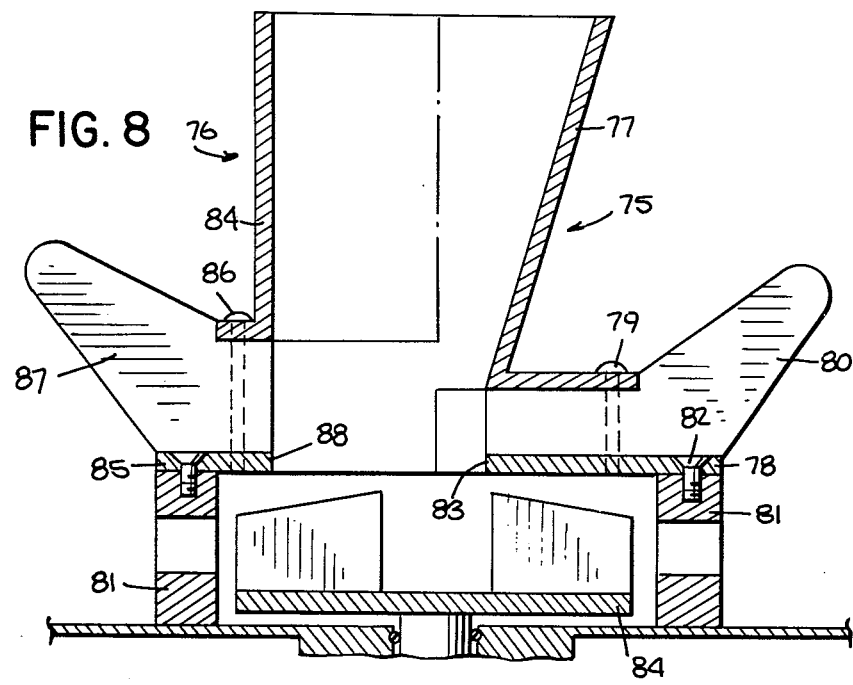
FIG. 8 is an elevation view in half-section of interchangeable feed conduit and cover plate embodiments.

FIG. 8 illustrates the flexibility of the apparatus of the present invention in accommodating mixtures with a wide range of viscosities in a mixer having an impeller of a given size. The right half of FIG. 8 is a half-section of an embodiment 75 adapted for mixing materials of relatively low viscosity, and the left side of the figure is a half-section of an alternate embodiment 76 for mixing materials of relatively high viscosity. For each embodiment, the half section not shown is symmetrical with the half-section shown.

Embodiment 75 includes a feed conduit 77 connected to a circular plate 78 by machine screw 79 passing through combination guide vane and spacer 80. Circular plate 78, in turn, is mounted on annular wall member 81 by machine screws 82. Wall member 81 is similar to wall 26 in FIG. 1, and all other elements of the mixer in FIG. 8 correspond to similar elements in the previously described mixers.

In embodiment 75 the outlet diameter of conduit 77 and the diameter of inlet hole 83 through the center of plate 78 are substantially equal to the diameter of the eye of impeller 84. These represent approximately the minimum practical diameters for these openings.

Embodiment 76 includes a feed conduit 84 connected to a circular plate 85 by machine screw 86 passing through combination guide vane and spacer 87 as in the arrangement of embodiment 75. Plate 85 is attached to wall member 81 by the same machine screws 82 as are used for plate 78 in embodiment 75. Thus, the two embodiments can be easily interchanged merely by removing screws 82 and replacing one embodiment with the other.

In embodiment 76, the outlet diameter of feed conduit 84 and the diameter of central inlet hole 88 through plate 85 are a relatively large percentage of the outside diameter of the blades of impeller 84. For example, the difference in diameters may be as little as one inch, so that the mixture of material added through conduit 84 and the material entering inlet hole 88 from the container flows primarily only through the outer one-half inch of the impeller blades. As mentioned above, embodiment 76 will handle much more viscous mixtures without clogging than will embodiment 75, both because the diameters of conduit 84 and inlet hole 88 are larger than the corresponding diameters of conduit 77 and inlet hole 83 and because the vertical spacing between the outlet of conduit 84 and plate 85 is greater than the corresponding spacing between conduit 77 and plate 78.

A family of feed conduits, vane-spacers, and cover plates spanning a range of sizes between embodiments 75 and 76 can provide combinations to meet a variety of mixing requirements. Different height spacers used with a given size feed conduit and cover plate inlet, for example, will control the ratio of recirculation flow to added ingredient rate. By providing equal spacing and thread size for the screw holes in all the components, interchangeability is assured.

Figure 9:
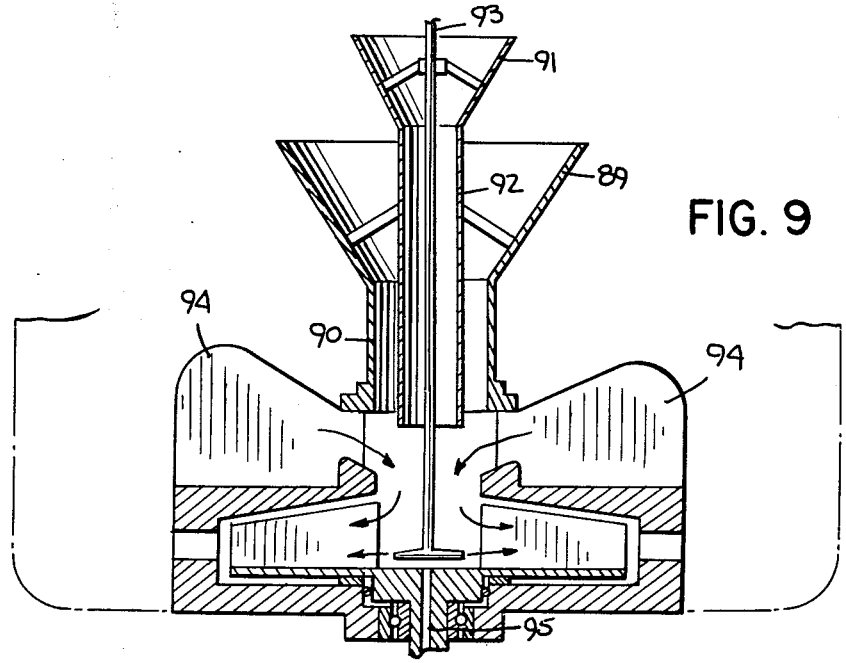
FIG. 9 is an elevation view in section of an alternate embodiment for mixing multiple ingredients.

FIG. 9 illustrates still another arrangement of the mixing apparatus of the present invention which combines coaxial feed conduits for two liquid or solid ingredients plus a gas. A first ingredient, which may be solid dye, for example, is added through a funnel opening 89 in an outer coaxial feed conduit 90. Simultaneously, a second ingredient (e.g., a liquid dye) is added through a funnel opening 91 of an intermediate coaxial feed conduit 92. Optionally, or in addition, a gaseous ingredient can be added through inner coaxial feed conduit 93. The three feed conduits are supported in spaced relation by guide vanes 94 although equivalent supporting means can be used. The gaseous ingredient can also be added through a central passageway 95 in the impeller shaft instead of or in addition to supplying it through inner feed conduit 93.

An important feature of the embodiment of FIG. 9 is that the gaseous ingredient is added within the eye of the impeller as close as possible to the base plate, rather than at the inlet to the cover plate as in FIG. 4. In this way full advantage is taken of the maximum head available from the recirculated material in the container so that pressure augmentation by the venturi device of FIG. 4 is not required to prevent cavitation.

The mixing effectiveness of the method and apparatus of the invention has been demonstrated by a prototype device similar to that shown in FIG. 1 and having the characteristics listed in Table 1.

TABLE 1

| Container: | 9 inch diameter (approx.) |
| --- | --- |
| | 2 gal. capacity |
| Motor: | 1 horsepower (12 amp) |
| | variable speed control, |
| | 0–9000 rpm |
| Impeller: | 0–4500 rpm |
| | 3 inch diameter, open face |
| | Five backward-curved blades |
| | 3–8 gpm rated cap. |
| Housing: | 1-1/8 inch inlet diameter |
| | Six - 5/16 inch jet nozzles |
| | 1/8 inch impeller clearance (approx.) |
| Feed Tube: | 2-3/4 inch inlet diameter |
| | 1-1/4 inch outlet diameter |
| | 1/2 inch (approx.) axial spacing |
| | from conduit outlet to housing inlet |
| Guide Vanes: | Three - radial vanes |

EXAMPLE

A saturated sugar syrup (62–67 percent sugar by weight) was made by the following procedure:

a. pour 2½ quarts of cold water (70°F.) into the container,
b. turn motor on and adjust speed for half-power (6 amps),
c. pour 10 pounds of granulated sugar into feed tube as fast as possible without overflowing (approximately 30 seconds between starting to pour and completion with no material remaining in the tube),
d. increase motor speed to about 80–90% power (9 amps) and run for 4½ minutes.

As soon as all the sugar is poured through the feed tube, it instantly mixes and uniformly disperses through the water. At this point it is not dissolved, however, and will settle out if the mixture is allowed to stand. After 4½ minutes additional mixing (i.e., total 5 minutes elapsed time) the sugar is completely dissolved, and the mixture has increased in temperature to approximately 80° F. No sugar will subsequently recrystallize and settle out of solution, regardless of the time the mixture is allowed to stand.

From the foregoing descriptions of the various embodiments of the present invention, it is clear that all provide a unique and improved mixing action. An important feature of the present invention is that mixing takes place within the storage container, thus, eliminating pipe, fittings and valves. By placing the centrifugal impeller within the container, improved mixing action is obtained both through recirculation of a portion of the fluid in the container through the impeller as material is added and through secondary mixing action obtained from high velocity streams of the mixed ingredients leaving the impeller. Previous centrifugal mixers have used conventional centrifugal pumps to provide the mixing action. For maximum pumping efficiency, these pumps are designed with scroll type cases to convert the high momentum of the fluid leaving the impeller into high pressure of the fluid leaving the pump casing. This conversion produces inefficient mixing. On the other hand the apparatus and method of the present invention maintain the high kinetic energy of the fluid streams leaving the impeller and use this kinetic energy to obtain improved secondary mixing of the fluid in the container.

I claim:

1. An apparatus for mixing a second material into a first fluid material of the type including a motor-driven rotating centrifugal impeller and a conduit having an outlet coaxial with and adjacent to the centrifugal impeller for feeding the second material into the center of the impeller for outward flow therethrough, the improvement comprising:

a container for the first material;

means for directing a portion of the first fluid from the container inward for mixing with the second material as it enters the center of the impeller; and means for directing at least a portion of the mixture flowing from the impeller outward at high velocity for dispersion in the fluid in the container, said means including a structure in radially spaced surrounding relation to the circumference of the centrifugal impeller, said structure having at least two circumferentially spaced passageways with inlets adjacent the impeller and equally spaced outlet nozzles opening into the container for conserving the momentum imparted to the fluid mixture by the impeller to produce secondary mixing action with the remainder of the material in the container.

2. An apparatus for mixing a second material into a first fluid material of the type including a motor-driven rotating centrifugal impeller and a conduit having an outlet coaxial with and adjacent to the centrifugal impeller for feeding the second material into the center of the impeller for outward flow therethrough, the improvement comprising:

a container for the first material;

means for directing a portion of the first fluid from the container inward for mixing with the second material as it enters the center of the impeller;

a structure in radially spaced surrounding relation to the circumference of the centrifugal impeller, said structure having at least two circumferentially spaced passageways with inlets adjacent the impeller and outlets opening into the container;

a venturi section surrounding and coaxial with the conduit for feeding the second material into the center of the centrifugal impeller; and means for directing at least a portion of the mixture flowing from the impeller to the inlet of the venturi section including a nozzle coaxial with and adjacent to the inlet to the venturi section and at least two equally spaced tubes connected between the structure surrounding the centrifugal impeller and the inlet of the nozzle, said tubes defining passageways having inlets in the wall of said structure adjacent the circumference of the impeller and outlets opening into the nozzle.

3. An apparatus for mixing a second material into a first fluid material of the type including a motor-driven rotating centrifugal impeller and a tube having an outlet coaxial with and adjacent to the centrifugal impeller for feeding the second material into the center of the impeller for outward flow therethrough, the improvement comprising:

a container for the first material;

means for directing a portion of the first fluid from the container inward for mixing with the second material as it enters the center of the impeller;

a structure in radially spaced surrounding relation to the circumference of the centrifugal impeller, said structure having at least two circumferentially spaced passageways with inlets adjacent the impeller and outlets opening into the container;

a venturi section coaxially surrounding the outlet end of the tube for feeding the second material into the center of the centrifugal impeller, the inlet of the venturi being open to the material in the container; and enclosed means for directing at least a portion of the mixture flowing from the impeller to an outlet spaced above the inlet of the venturi section, whereby said recirculated mixture helps to draw fluid from the container into the venturi for mixing with the second material being fed from the outlet end of said tube.

4. A method of mixing a second material into a first fluid material in a container comprising the steps of:

directing a portion of the first material to form an inward flowing stream into the center of a rotating centrifugal impeller in the container;

feeding the second material into the center of the impeller so that it combines with the stream of first material as it enters the center of the impeller;

directing the mixture of first and second materials flowing from the impeller to form a plurality of high velocity streams flowing outward and dispersing in fluid in the container; and recirculating a portion of the mixture flowing from the impeller through at least two equally spaced tubes to a nozzle coaxial with and adjacent to the inlet of a venturi section disposed coaxially with the axis of impeller rotation with its outlet adjacent the center of the impeller on the side from which the second material is fed to augment the fluid pressure entering the center of the impeller.

* * * * *